(12) United States Patent
Lippert

(10) Patent No.: US 8,523,733 B1
(45) Date of Patent: Sep. 3, 2013

(54) VEHICLE DRIVELINE DIFFERENTIAL WITH IMPROVED EFFICIENCY DURING VEHICLE COLD STARTS

(75) Inventor: Robert Scott Lippert, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 13/562,164

(22) Filed: Jul. 30, 2012

(51) Int. Cl.
*F16H 57/08* (2006.01)

(52) U.S. Cl.
USPC ............ 475/348; 277/423; 277/433; 475/160

(58) Field of Classification Search
USPC .............. 384/477, 492, 493, 557, 907, 907.1, 384/535, 581; 277/423, 433; 74/608, 612; 475/117, 159, 160, 248
See application file for complete search history.

(56) References Cited

U.S. PATENT DOCUMENTS

| | | | |
|---|---|---|---|
| 3,306,679 A | 2/1967 | Stokely | |
| 4,226,485 A * | 10/1980 | Pruvot | 384/557 |
| 4,656,885 A * | 4/1987 | Hori et al. | 74/467 |
| 5,044,789 A | 9/1991 | Damon | |
| 5,061,089 A | 10/1991 | Bair | |
| 5,269,198 A | 12/1993 | Fukushima | |
| 5,718,436 A * | 2/1998 | Dunford | 277/423 |
| 6,508,619 B1 * | 1/2003 | Bosen | 415/111 |
| 6,731,456 B2 | 5/2004 | Parsoneault et al. | |
| 7,503,697 B2 * | 3/2009 | Tsuji et al. | 384/476 |
| 7,967,713 B2 * | 6/2011 | Haupt et al. | 475/160 |
| 8,172,463 B2 * | 5/2012 | Nakajima et al. | 384/492 |
| 2002/0186908 A1 | 12/2002 | Tsujimoto | |
| 2005/0232524 A1 * | 10/2005 | Fukuda et al. | 384/516 |
| 2008/0175739 A1 | 7/2008 | Prior | |
| 2010/0247280 A1 * | 9/2010 | Liu et al. | 414/744.2 |

* cited by examiner

*Primary Examiner* — Justin Holmes
(74) *Attorney, Agent, or Firm* — James Dottavio; MacMillan, Sobanski & Todd, LLC

(57) ABSTRACT

The present disclosure relates to a vehicle driveline differential with improved efficiency during vehicle cold starts, the differential includes: a pinion; and a pinion bearing journaled onto a shaft of the pinion. The pinion bearing includes a thermal-insulation sleeve.

16 Claims, 4 Drawing Sheets

VEHICLE DRIVELINE DIFFERENTIAL WITH IMPROVED EFFICIENCY DURING VEHICLE COLD STARTS

TECHNICAL FIELD

The present disclosure relates to improved efficiency for vehicle driveline differentials.

BACKGROUND

Most modern vehicles include some sort of driveline differential to compensate for travel differences between wheels on common axles during turns. The differential usually includes a pinion bearing assembly with one or two bearings journaled onto a pinion shaft. Driveline bearings are lubricated with high-viscosity oil to cool the bearing assembly during operation. This oil can cause parasitic losses. This is especially true during a vehicle cold-start or when the bearings are at a relatively low temperature. For example, in some instances it can take 20 minutes for an entire driveline differential to reach a relatively warmed temperature. During that time, the losses in the bearings can be two to three times greater than the losses when the bearings are warmed. Accordingly, there is a need to reserve heat in the bearing assembly so that the time required to warm-up the entire bearing assembly after cold starts is significantly reduced.

Thermal insulation for bearings has been used before to isolate the bearing from heat exhausted from neighboring components. For example, U.S. Pat. No. 5,687,618 titled "Flywheel Assembly" teaches the use of an insulation member on a ball bearing for a flywheel torsional damper. This, however, does not pertain to vehicle driveline differentials.

It is therefore desirable to have a vehicle driveline differential with improved efficiency during cold starts.

SUMMARY

The present disclosure addresses one or more of the above-mentioned issues. Other features and/or advantages will become apparent from the description which follows.

One exemplary embodiment relates to a vehicle driveline differential with improved efficiency during vehicle cold starts, the differential includes: a pinion; a pinion bearing journaled onto a shaft of the pinion; and a valve configured to impeded flow from the pinion bearing. The valve is composed of at least two metals. The pinion bearing includes a thermal-insulation sleeve.

Another exemplary embodiment relates to a vehicle with improved efficiency during vehicle cold starts, the vehicle having: a vehicle axle; a driveline differential positioned with respect to the axle; a pinion bearing assembly in the differential; and a valve configured to impede flow from the pinion bearing. The valve is composed of at least two metals. The pinion bearing assembly includes a pinion bearing to which a thermal-insulation sleeve is attached.

Another exemplary embodiment relates to a method of manufacturing a vehicle driveline differential with improved efficiency during vehicle cold starts, the method including: attaching a thermal-insulation sleeve to a pinion bearing; incorporating a bi-metal valve in the driveline configured to impede flow from the pinion bearing; and journaling the pinion bearing onto a pinion shaft.

One advantage of the present disclosure is that the teachings improve fuel economy when the vehicle is operating in colder ambient temperatures, e.g., 20 degrees F. Fuel efficiency is also improved at warmed-up temperatures. With the present teachings the bearings reach a higher stabilized operating temperature. Bearings also warm up more quickly when soaked to cold temperatures. Parasitic losses are also reduced by the present teachings as changing the local operating temperature also changes the viscosity of the gear oil within the differential.

The invention will be explained in greater detail below by way of example with reference to the figures, in which the same references numbers are used in the figures for identical or essentially identical elements. The above features and advantages and other features and advantages of the present invention are readily apparent from the following detailed description for carrying out the invention when taken in connection with the accompanying drawings. In the figures:

DETAILED DESCRIPTION

Figure 1:
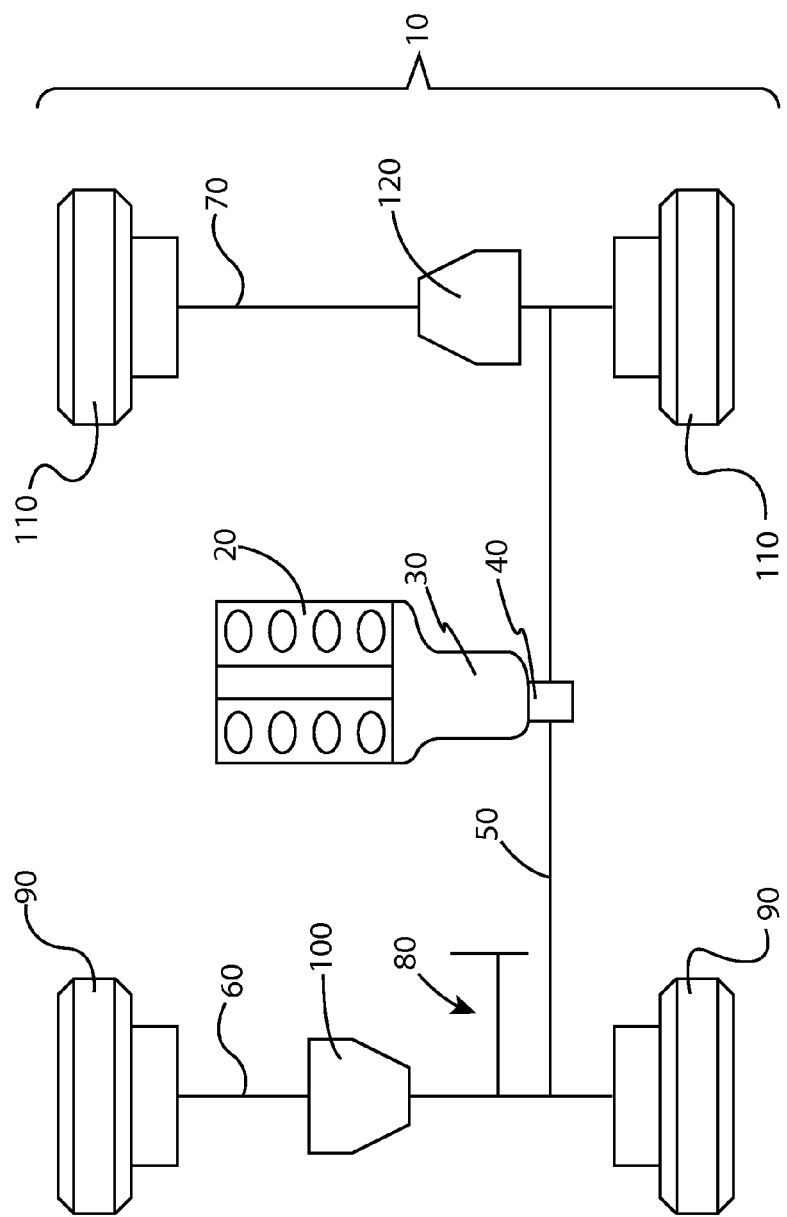
FIG. 1 is a schematic view of a vehicle driveline with differentials according to an exemplary embodiment of the present disclosure.

Referring to the drawings, wherein like characters represent examples of the same or corresponding parts throughout the several views, there are shown various vehicle driveline differentials with improved efficiency. Differentials include a pinion bearing assembly with thermal-insulation sleeves (or members) on the pinion bearings that conserve thermal energy prior to vehicle cold starts. Thermal-insulation sleeves, for example, provide a passive thermal management strategy of differential temperatures where spin loss is probable. When operating at warmer start temperatures vehicles having the exemplary differentials demonstrate greater fuel economy. Any type of vehicle is compatible with the exemplary driveline differentials including but not limited to pickup trucks, vans, sedans, coupes, convertibles or SUVs.

Now with reference to FIG. 1, there is shown therein a schematic plan view of a vehicle 10 compatible with an exemplary driveline differential as discussed hereinbelow. The vehicle 10 is a four-wheel drive vehicle. As shown, an engine 20 is laterally mounted with respect to the vehicle 10. A transmission 30 includes a transfer case 40. A main drive axle 50 is connected to a front and rear drive axle 60, 70, respectively. Front drive axle 60 is connected to a steering assembly 80 and a pair of front wheel assemblies 90. A front axle differential 100 is in the front axle 60. Rear drive axle 70 is connected a pair of rear wheel assemblies 110. In the rear axle 70, is a rear axle differential 120. Differentials 100, 120 have pinion bearing assemblies with a thermal-insulation sleeve (or member) on the pinion bearing as discussed hereinbelow.

Figure 2:
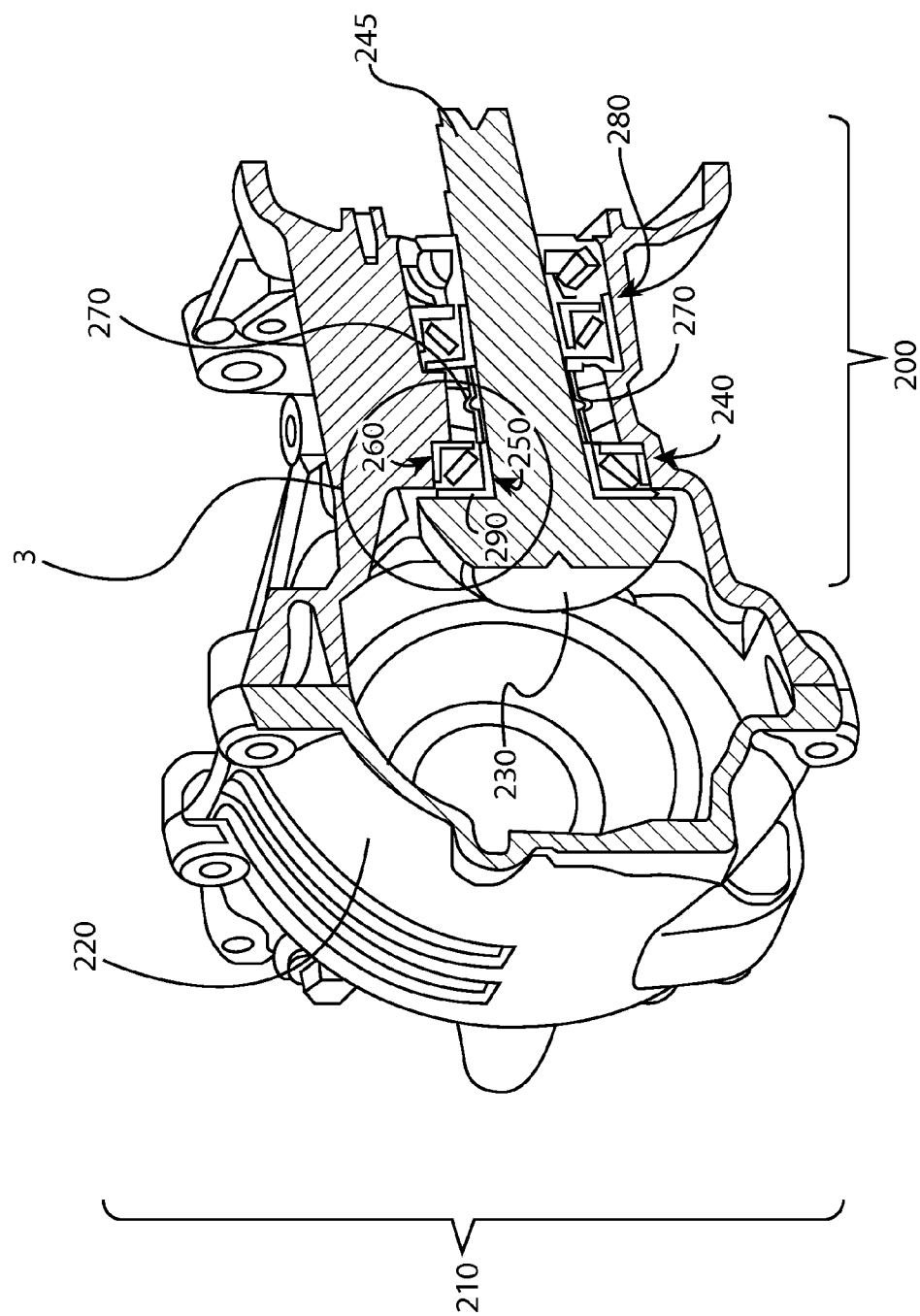
FIG. 2 is a cross-sectional perspective view of an exemplary driveline differential.

Referring now to FIG. 2, there is shown therein an exemplary pinion assembly 200 (or pinion bearing assembly) in a driveline differential 210. The differential 210 can be configured for use in any automotive driveline. Included in housing 220 is a pinion head 230. Pinion head 230 reacts against another gearing component (not shown). A pinion head bearing 240 is loaded into the housing proximate the head of the pinion 230. In this embodiment, the head bearing 240 is a tapered or an angular contact roller bearing (or ACRB) journaled onto a pinion shaft 245. The ACRB has an inner and outer race 250, 260, respectively as shown. A collapsible spacer 270 is interspersed between the head bearing 240 and a tail bearing 280, which in this embodiment, is also an ACRB.

Figure 3:
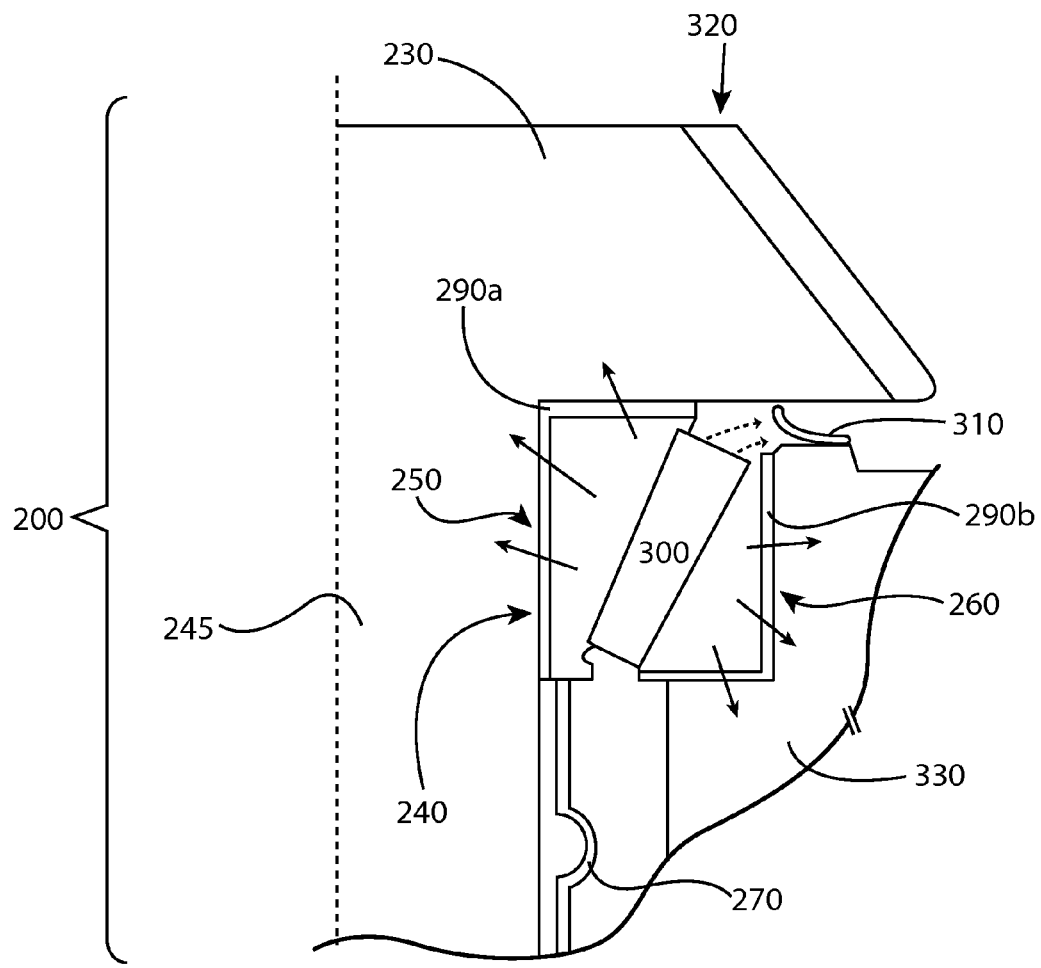
FIG. 3 is a cross-sectional view of the pinion bearing assembly of FIG. 2 at Circle 3.

FIG. 3 illustrates a partial cross-sectional view of the head pinion bearing 240 of FIG. 2 at Circle 3. The pinion head 230 is shown. Head bearing 240 is journaled onto the shaft 245 of the pinion. Head pinion bearing 240 includes a thermal-insulation sleeve 290 on the inner race and outer race of the pinion bearing, 250, 260, respectively. Sleeve 290 includes portion 290a on the inner race of the pinion bearing and portion 290b on the outer race of the pinion bearing. Sleeve 290 is the bearing housing in the shown embodiment. In other embodiments, sleeve can be fastened or attached to bearing housing. Sleeve 290 inhibits heat energy from escaping the roller 300 and inner portion of the pinion bearing. Thermal-insulation sleeve 290 is composed of a ceramic material in the shown embodiment. By adding a ceramic buffer heat flux away from the bearing 240 is reduced. Bearing 240 can be heated more quickly and oil viscosity reduces more rapidly. Thus heavy gear oil for hypoids can be used with low losses to the bearings. Sleeve 290 can be composed of other thermal insulators besides ceramic material.

Also included in the embodiment of FIG. 3 is a valve 310 in the pinion bearing assembly 200. Valve 310 is a ring or washer configured to impede flow from the pinion bearing to other components in the differential, e.g., the opposing side 320 of the pinion head 230. Valve 310 can stop or slow flow through the bearing 240 when oil is relatively cold. Such control will enable oil to heat up and reduce viscosity. Valve 310 can be attached to component 330 via an adhesive or fastener. Valve 310 is composed of a bi-metal material having at least two metals. Valve 310 provides an active bi-metal control of differential temperatures. Other active controls can be incorporated in the differential.

Figure 4:
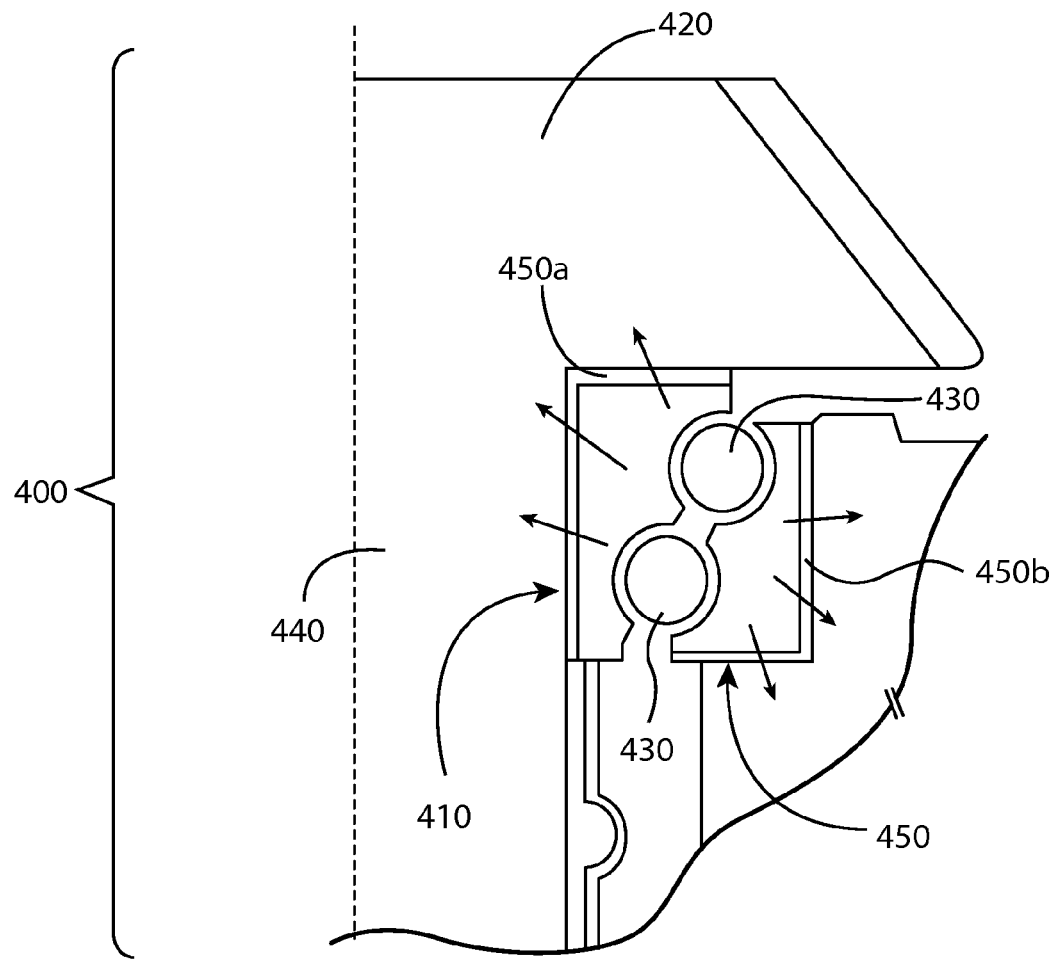
FIG. 4 is a cross-sectional view of another exemplary pinion bearing assembly.

Turning now to FIG. 4 there is shown therein another exemplary embodiment of a pinion bearing assembly 400. FIG. 4 illustrates a partial cross-sectional view of a head pinion bearing 410. A pinion head 420 is shown. Pinion bearing 410 is a ball bearing in this embodiment. Two balls 430 are included in the pinion bearing 410. Pinion bearing 410 is an tapered or angular contact ball bearing (or ACBB). Pinion bearing 410 is journaled onto a shaft 440 of the pinion. Pinion bearing 410 also includes a thermal-insulation sleeve 450 on the inner race and outer race of the pinion bearing, 450a and 450b, respectively. Sleeve 450 includes portion 450a on the inner race of the pinion bearing and portion 450b on the outer race of the pinion bearing. Sleeve 450 inhibits heat energy from escaping the balls 430 and inner portion of the pinion bearing. Thermal-insulation sleeve 450 is composed of a ceramic material in this embodiment.

The present disclosure also includes a method of manufacturing a vehicle driveline differential with improved efficiency during vehicle cold starts. Exemplary driveline differentials are shown in FIGS. 1-4. The method includes the following steps: (i) attaching a thermal-insulation sleeve (e.g., 290 as shown in FIG. 3 or 450 as shown in FIG. 4) to a pinion bearing (e.g., 240 as shown in FIG. 3 or 410 as shown in FIG. 4); and (ii) journaling the pinion bearing onto a pinion shaft (e.g., 245 as shown in FIG. 3 or 440 as shown in FIG. 4). In one embodiment, the method includes positioning the thermal-insulation sleeve on an inner race of the pinion bearing and/or positioning the thermal-insulation sleeve on an outer race of the pinion bearing (e.g., as shown in FIGS. 3 and 4).

Thermal-insulation sleeves are termed "sleeves" as examples of any component that partially or fully houses bearing components. Any coating, covering or housing can act as a sleeve on the pinion bearings for the purposes of this discussion.

Those familiar with the art to which this disclosure relates will recognize various alternative designs and embodiments for practicing the invention within the scope of the appended claims.

I claim:

1. A vehicle driveline differential with improved efficiency during vehicle cold starts, the differential comprising:
   a pinion;
   a pinion bearing journaled onto a shaft of the pinion; and
   a valve configured to impede flow from the pinion bearing;
   wherein the valve is composed of at least two metals;
   wherein the pinion bearing includes a thermal-insulation sleeve.

2. The differential of claim 1, wherein the thermal-insulation sleeve is positioned on an inner race of the pinion bearing.

3. The differential of claim 1, wherein the thermal-insulation sleeve is positioned on an outer race of the pinion bearing.

4. The differential of claim 1, wherein the pinion bearing is a tapered bearing.

5. The differential of claim 4, wherein the pinion bearing is a roller bearing.

6. The differential of claim 5, wherein the pinion bearing is a ball bearing.

7. A vehicle with improved efficiency during vehicle cold starts, the vehicle comprising:
   a vehicle axle;
   a driveline differential positioned with respect to the axle;
   a pinion bearing assembly in the differential; and
   a valve configured to impede flow from the pinion bearing;
   wherein the valve is composed of at least two metals;
   wherein the pinion bearing assembly includes a pinion bearing to which a thermal-insulation sleeve is attached.

8. The vehicle of claim 7, wherein the axle is a front drive axle.

9. The vehicle of claim 7, wherein the axle is a rear drive axle.

10. The vehicle of claim 7, wherein the pinion bearing is a tapered roller bearing.

11. The vehicle of claim 7, wherein the pinion bearing is a tapered ball bearing.

12. The vehicle of claim 7, wherein the thermal-insulation sleeve is positioned on an inner race of the pinion bearing.

13. The vehicle of claim 7, wherein the thermal-insulation sleeve is positioned on an outer race of the pinion bearing.

14. A method of manufacturing a vehicle driveline differential with improved efficiency during vehicle cold starts, the method comprising:
   attaching a thermal-insulation sleeve to a pinion bearing;
   incorporating a bi-metal valve in the driveline configured to impede flow from the pinion bearing; and
   journaling the pinion bearing onto a pinion shaft.

15. The method of claim 14, further comprising:
   positioning the thermal-insulation sleeve on an inner race of the pinion bearing.

16. The method of claim 14, further comprising:
   positioning the thermal-insulation sleeve on an outer race of the pinion bearing.

* * * * *